United States Patent
Debu et al.

(10) Patent No.: US 11,380,146 B2
(45) Date of Patent: Jul. 5, 2022

(54) METHOD AND SYSTEM TO DETERMINE VEHICLE TYPE IDENTIFICATION THROUGH DIAGNOSTIC PORT

(71) Applicant: MUNIC, Villejuif (FR)

(72) Inventors: Cyprien Debu, Villejuif (FR); Julien Zarka, Villejuif (FR); Adlane Achab, Bagneux (FR)

(73) Assignee: MUNIC, Villejuif (FR)

( * ) Notice: Subject to any disclaimer, the term of this patent is extended or adjusted under 35 U.S.C. 154(b) by 178 days.

(21) Appl. No.: 16/499,903

(22) PCT Filed: Apr. 25, 2017

(86) PCT No.: PCT/IB2017/000655
§ 371 (c)(1),
(2) Date: Oct. 1, 2019

(87) PCT Pub. No.: WO2018/197920
PCT Pub. Date: Nov. 1, 2018

(65) Prior Publication Data
US 2020/0118362 A1    Apr. 16, 2020

(51) Int. Cl.
*G07C 5/08*        (2006.01)
*G06F 16/9035*     (2019.01)
(Continued)

(52) U.S. Cl.
CPC ......... *G07C 5/0808* (2013.01); *G05D 1/0027* (2013.01); *G06F 16/9035* (2019.01); *H04L 12/40* (2013.01); *H04L 2012/40273* (2013.01)

(58) Field of Classification Search
CPC .. G07C 5/0808; G07C 2205/02; G07C 5/008; G06F 16/9035; G05D 1/0027; H04L 12/40; H04L 2012/40273; H04L 67/12
See application file for complete search history.

(56) References Cited

U.S. PATENT DOCUMENTS

2011/0071724 A1    3/2011  Heine et al.
2013/0204485 A1    8/2013  Chen et al.
(Continued)

FOREIGN PATENT DOCUMENTS

DE         3904892        8/1989

OTHER PUBLICATIONS

International Search Report for PCT/IB2017/000655 dated Jan. 17, 2018, 4 pages.

*Primary Examiner* — Michael V Kerrigan
(74) *Attorney, Agent, or Firm* — Dority & Manning, P.A.

(57) ABSTRACT

In one aspect, a method is carried out in a system including diagnosis plug-in device, a host server, diagnostics database suppliers, and on-board ECUs, with the method including coupling the diagnosis plug-in device to the diagnosis port of a vehicle of interest having a certain vehicle type defined at least by the Make/Model/Year/Powertrain of the vehicle of interest; causing the diagnosis plug-in device to listen on a diagnosis and receiving frames broadcasted by onboard ECUs; after said Bus Active condition is detected, determining a frame profile according to characteristics of the received frame-IDs; determining vehicle type from the frame profile, with the help of a frame profile lookup table; and providing a diagnosis stacks dataset database at the diagnosis plug-in device or at the host server, said diagnosis stacks dataset comprising at least available request/answer services for the vehicle type of interest.

15 Claims, 4 Drawing Sheets

(51) Int. Cl.
    *G05D 1/00*          (2006.01)
    *H04L 12/40*       (2006.01)

(56) References Cited

U.S. PATENT DOCUMENTS

| | | | |
|---|---|---|---|
| 2014/0279230 A1* | 9/2014 | Bertosa | G06Q 30/0613 705/26.41 |
| 2014/0365064 A1 | 12/2014 | Pham | |
| 2015/0121275 A1 | 4/2015 | Marshall et al. | |

\* cited by examiner

FIG. 3 VIN breakdown

OBD Plug-In Device

METHOD AND SYSTEM TO DETERMINE VEHICLE TYPE IDENTIFICATION THROUGH DIAGNOSTIC PORT

FIELD OF THE INVENTION

The present invention relates to methods and systems for determining vehicle type identification, e.g. VIN (Vehicle Identification Number) or equivalent data defining the vehicle type. The thus obtained information is used by a diagnosis plug-in device to collect various static and dynamic data on rolling vehicles from onboard ECUs (Electronic Control Unit) and to transmit this data wirelessly to one or more remote server(s).

BACKGROUND OF THE DISCLOSURE

There is an increasing need to collect information about motor vehicles, either for fleet management, insurance personalized charge policy, traffic jam management, or other purposes.

One popular solution to remotely collect and transmit various data like vehicle speed, fuel consumption, vehicle geolocation, etc. is to add a plug-in device that can be plugged into the OBD plug (sometimes called OBDII plug/port/connector or Diagnose plug port/connector which form a communication interface). The diagnosis plug-in device ('Diag plug in Device in short) is sometimes called 'Dongle' or 'dongle unit'. The desired data is collected using messages on a serial bus (often CAN bus or J1850 or J1708 or sometimes K-line or Ethernet). Each vehicle manufacturer has its own messages definition. Practically, even each technical platform have its own messages definition (several commercial variants may be derived from one technical platform).

A subset of services (question/answers) is defined by a OBD standard ISO 15031. This minimal subset originates from pollution monitoring purposes. Additional services may be available in the standard or out of the standard.

But some of the set of available services differ from one platform vehicle type to another.

Support of the standard services and availability of additional specific services are defined a priori according to the vehicle type obtained from the VIN of the considered vehicle (vehicle of interest). However it turns out that the VIN is not always available and sometimes the VIN is erroneous. Also retrieval of VIN requires to write a request on the bus which turns out to be sometimes troublesome.

A large number of vehicles are to be equipped with diagnosis plug-in devices; in practice one plug-in device is installed on one targeted vehicle. But, all plug-in devices are identical before being installed on one particular vehicle. They are designed as "universal dongle". Such plug-in device is very small, has no display no user interface, it is intended to be installed in a very small volume next to the OBD plug/connector.

It is not realistic to parametrize each plug-in device individually after the installation by a specific tool since the installation is done by non-qualified personnel.

Hence, each plug-in device has to automatically 'discover' on which type of vehicle it has just been installed. US2015121275 illustrates this process.

The inventors have found that this automatic discovering process has to take into account cases of erroneous VIN and even cases of non-available VIN. There is therefore a need to provide a universal plug-in device which can cope with various disorders regarding the VIN; more importantly there is also a need to avoid requesting the VIN in order to decrease the risk of disturbing the bus operation.

SUMMARY OF THE DISCLOSURE

According to one aspect of the present invention, it is disclosed a method carried out in a system, the system comprising at least a diagnosis plug-in device (1) a host server (2), one or more diagnostics database suppliers (4), one or more on-board ECUs (3), the method comprising the following steps:

/a/ couple the diagnosis plug-in device to the diagnosis port (8) of a vehicle of interest, said vehicle of interest having a certain vehicle type, said vehicle type being defined at least by the Make/Model/Year/Engine of the vehicle of interest, /b/ cause the diagnosis plug-in device to listen on at least one diagnosis bus accessible on the diag port, receive frames broadcasted by onboard ECUs and detect therefrom a Bus Active condition, /c/ after said Bus Active condition is verified, at the diagnosis plug-in device, determine a frame profile according to characteristics of the received frame-IDs, /d1/ determine vehicle type from the frame profile, with the help of a frame profile lookup table (22,22a) held in the diagnosis plug-in device (1) and/or in the host server (2), or /d2/, whenever no vehicle type corresponds to the instant frame profile in the frame profile lookup table (22,22a), then perform a VIN request sequence to alternately retrieve vehicle type, /e/ provide a diagnosis stacks dataset database (23) at the diagnosis plug-in device (1) and/or at the host server (2), comprising, for each recorded vehicle type, a diagnosis stacks dataset or a link thereto, said diagnosis stacks dataset comprising at least available request/answer services for the vehicle type of interest, /f/ if the diagnosis stacks dataset corresponding to this vehicle type is already available in the diagnosis stacks dataset database (23), proceed to step /h/, otherwise proceed to step /g/ and then step /h/, /g/ send vehicle type to one of the diagnostics database suppliers (4), and receive in return a diagnosis stacks dataset, /h/ carry out the request/answer services defined by the diagnosis stacks dataset to write requests on the diagnosis bus and retrieve, in the corresponding answers, various data from the board ECUs (3), and report such data in a decoded form to a client fleet management system (6).

Thanks to these dispositions, the method allows to generally avoid requiring the VIN number. The frame profile ('signature' or 'profile' of diag frames) enables to classify groups of similar vehicle electronic platform, and even though the VIN is not requested or not available, the knowledge of frame profile is sufficient to obtain the vehicle type and further to obtain therefrom the required diagnosis stacks dataset, either from a locally available information or retrieved from the remote resource.

As an exception, VIN is used alternately to retrieve the required vehicle type.

For the fleet manager, management of operation/maintenance/deliveries&missions can be easily handled; the proposed method also enables accurate collection of actual use for insurance purposes.

In various embodiments of the invention, one may possibly have recourse in addition to one and/or other of the following arrangements.

According to one particular option, the VIN request sequence comprises:

/d2a/ Ask on the bus vehicle VIN, namely Vehicle Identification Number, by a predefined request (Q-VIN), /d2b/ check validity of the retrieved VIN, by analyzing the 17 symbols contained therein, /d2c/ determine vehicle type, from the VIN, either by decoding the first nine character of the VIN. Thereby, whenever no vehicle type corresponds to the frame profile determined by the listening phase in the frame profile lookup table (22,22a), the method relies on the VIN that is made available by the OBD standard services and by decoding said VIN to induce the vehicle type required for the following steps.

According to one particular option, the method may further comprise at step /d2c/: the host server (2) uses a remote VIN decoder service (29).

In some case where the VIN refers to an unknown or new vehicle type, the recourse to a specialized remote VIN decoder service allows to retrieve the vehicle type; further the link with the corresponding frame profile is established.

According to one option, at step /d2b/, if the VIN is determined to be erroneous upon analyzing the 17 symbols contained therein, namely for example a Checksum problem, there is provided a further step /e2/ of inputting the VIN into a VIN Correction module and obtaining a corrected VIN. Thereby, some erroneous or non compliant VIN can be corrected from the knowledge of past VIN corrections.

According to one option, a plurality of pairs [frame profile, vehicle type] are stored in the frame profile lookup table (22,22a), and each time VIN request sequence is used for an unrecorded frame profile, a new record is added to the frame profile lookup table (22,22a) with the instant frame profile and the vehicle type determined at step /d2c/.

Thereby, whenever a new frame profile is encountered, it advantageously enriches the frame profile lookup table.

According to one option, a new record is added to diagnosis stacks dataset database (23) with the vehicle type determined at step /d2c/ and the diagnosis stacks dataset used at step /h/.

Advantageously, when the diagnosis stacks dataset is already available at the plug-in device or at the server, it avoids asking remotely such diagnosis stacks dataset to a service provider, which is a service that involves some cost.

According to one option, the determination of a frame profile is made by collecting, over a period of time DT1, the various frames circulating on the diagnosis bus, and retrieving for each frame: Frame-ID, repetition frequency and frame length, whereby a frame profile record comprises at least a list of (Frame-ID, repetition frequency, frame length). Thereby the frame profile can be established just by listening to and analyzing the free running frames.

According to one option, the determination of a frame profile record further comprises payload for each frame, ordered sequence of frames, time interval between some particular frames. This so-called complementary frame profile allows to distinguish close variants form each other.

According to one option, there can be defined an upgraded /complementary frame profile, which may include particular data about "invariant" portions in payloads of certain frames;

Also there may be provided a so called "hybrid" definition of frame profile which includes a first sub profile with IGN On (but engine Off), and a second sub profile with Engine On.

Also, advantageously, sporadic frames (i.e. not repeated periodically) are discarded and disregarded in the overall analysis.

According to one option, the period of time DT1 is predefined and is comprised between 1 s and 20 s, preferably between 3 s and 10 s. This is a simple way of handling the initial passive mode when the plug-In device only listens to the bus. Further, determining the frame profile by listening on the CAN bus requires few time.

According to one option, a Bus Active condition is determined when, on at least one bus, a mean number of frames per time unit increases more than a predefined threshold.

Whatever the vehicle logic to wake up the diag bus (Key ON transition, Door unlocking, or something else), this method can be used to readily know when the Bus is active and therefore when data can be collected, even though no relevant electrical signal is available at the OBD port. Key ON transition can be substituted by something equivalent.

According to one option, wherein the frame profile lookup table (22,22a) is stored at the host server (2) and updated by a plurality of plug-in devices installed on a plurality of vehicles, and a copy of the frame profile lookup table is downloaded from time to time to the plug-in device of the vehicle of interest.

According to one option, wherein diagnosis stacks dataset comprise access method, namely bus type and location in diag port pinout, and a list of available services. All necessary items to carry out useful request on the bus are thus available.

The present invention also targets a diagnosis plug in device, configured to carry out the method set out above.

The present invention also targets a system, including the diagnosis plug in device, the host server configured to carry out the method set out above.

BRIEF DESCRIPTION OF THE DRAWINGS

Other features and advantages of the invention appear from the following detailed description of one of its embodiments, given by way of non-limiting example, and with reference to the accompanying drawings, in which.

DETAILED DESCRIPTION OF THE DISCLOSURE

In the figures, the same references denote identical or similar elements.

Figure 1:
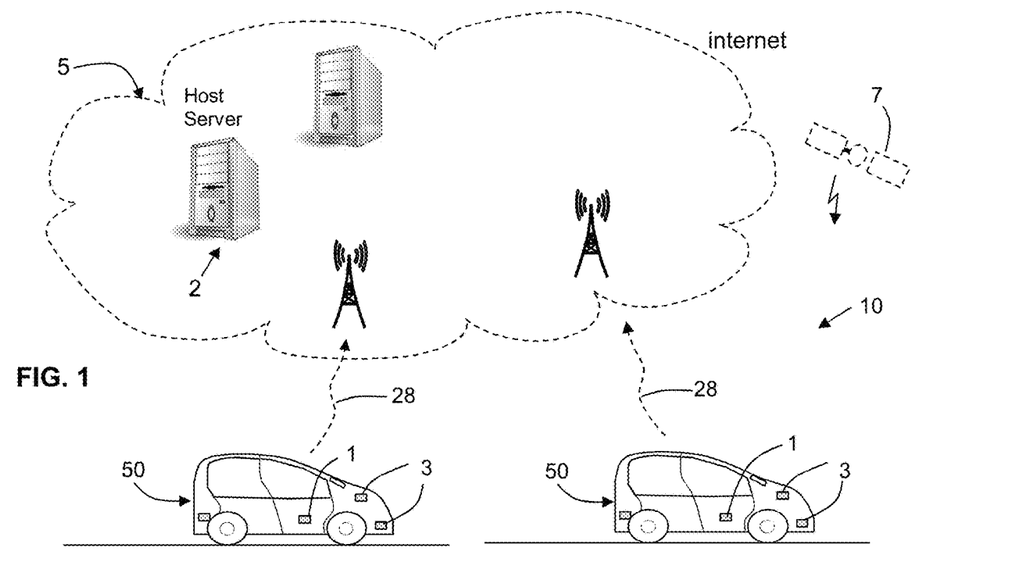
FIG. 1 illustrates a general overview of a system in which the Diag PlugIn devices according to the present disclosure are used.

FIG. 1 shows an exemplary system 10 in which are used Diagnosis PlugIn devices generally designated by reference numeral 1.

A large number of vehicles 50 are to be equipped with such plug-in devices; in practice one diagnosis plug-in device is installed on one targeted vehicle. All plug-in devices are identical before being installed on one particular vehicle. They are also referred to as "universal dongle".

Targeted vehicles include any type of usual vehicles, namely sedans, trucks, convertibles, heavyweight vehicles, station wagons and so on. Any brand/make is taken in consideration. Also motorcycles are taken in consideration.

In addition, any type of powertrain solution is considered such as ICE (internal combustion engine), hybrid, full electric . . . .

With reference to FIGS. 1 to 8, each of the targeted vehicle is equipped with on-board ECUs 3 and a diagnostics port 8 otherwise named OBD plug 8 or OBD connector. "OBD" stands for On Board Diagnostics. For heavyweight vehicles, motorcycles or some old passenger vehicles, the diagnostics port 8 is not necessarily a so-called "OBD port", it is generally a diagnostics port where a diagnostic tool ('Scan tool') can be coupled, notably for vehicle maintenance purpose.

At one moment in the service life of the vehicle 50, a Diagnosis PlugIn device 1 is plugged onto the OBD port 8.

Figure 2:
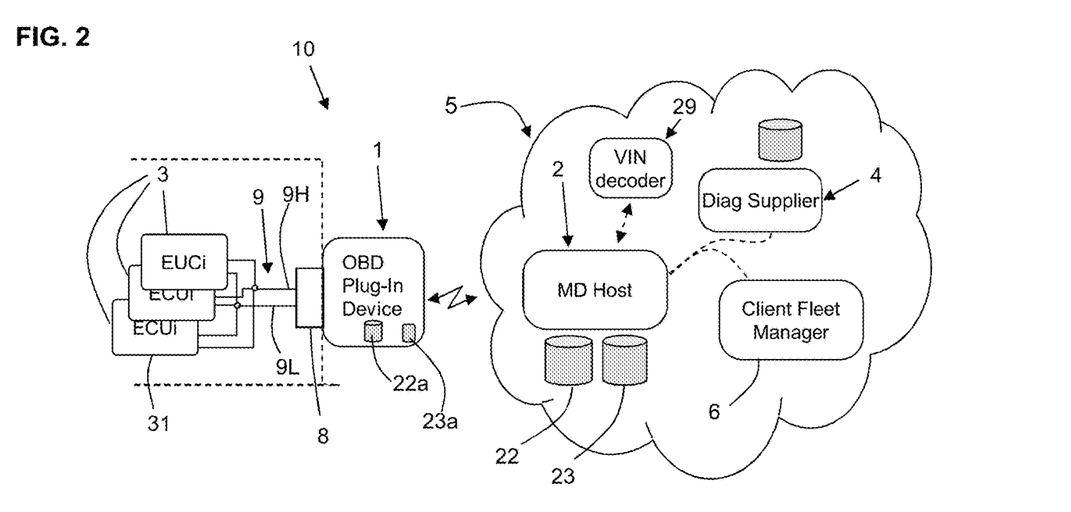
FIG. 2 shows a block diagram of a system in which the Diag PlugIn device according to the present disclosure are used.
Figure 6:
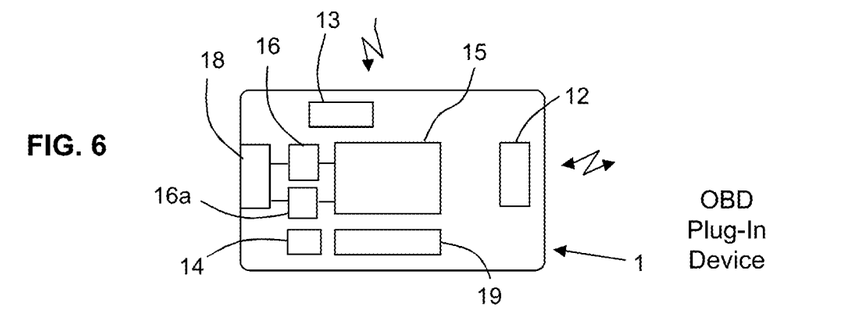
FIG. 6 shows an exemplary block diagram of the Diag PlugIn device.

Each Diagnosis PlugIn device 1 has wireless communication capability, with 3G, 4G, LTE, GPRS standards or any like solution. There is provided a wireless coupler 12, a microcontroller 15, a male connector 18. In most passenger vehicles, the connector 18 is a complementary counterpart of the OBD port defined by SAE J1962. For some heavyweight vehicles, since there is no compulsory standard for the diag connector, there is provided another method to establish the communication between the Diagnosis PlugIn device 1 and and vehicle diagnosis bus, namely a ring/wire coupling. Therefore, coupling Diagnosis PlugIn device 1 to vehicle diagnosis bus can be done either by a conventional electrical contact fashion, or by a contactless ring/wire coupling.

This wireless communication 12 enables the Diagnosis PlugIn device 1 to exchange data with a host server 2 which is located in one location remote from the vehicle, thanks to the wireless network flexibility.

In addition, the host server 2 is connected on the internet network, denoted by 5. There may be wired and wireless portions in the internet network.

Each Diagnosis PlugIn device 1 has at least a CAN bus interface 16, enabling to listen to at least one CAN bus 9 of the vehicle. Instead of CAN, the PlugIn device 1 may have a Ethernet bus interface.

In a particular case of the powertrain Can bus, there are two lines CAN-High 9H and CAN-Low 9L (cf FIG. 2) as defined in ISO 15765. The pinout of the OBD plug 8 is predefined, according to standard SAE J1962, it comprises 16 pins with particular allocation.

Instead of CAN highspeed, the interface between Diag PlugIn device 1 and on-board ECUs 3 can be made through J1939, CAN 250k, CAN single Line, Ethernet, K line ISO 9141, J1850 or other equivalent means. There may be provided two or more communication interfaces 16, 16a.

Since the Diagnosis PlugIn device 1 is intended to be 'universal', it contains cumulatively hardware/firmware/protocol handler for all the possible cases namely, CAN High speed, J1939, CAN 250k, CAN single Line, Ethernet, K line ISO 9141, J1850.

For CAN High speed, it is referred to ISO 15765-4; for K-line, it is referred to the so called KWP2000.

In addition, optionally, each Diagnosis PlugIn device 1 may have a geolocation functionality 13, based on signal acquisition from GPS satellites 7 or the like, and calculation of geo position, as known per se.

Each Diag PlugIn device 1 may have an accelerometer 14, in complement to GPS in order to sense the vehicle movement.

Each Diag PlugIn device 1 may comprise a backup battery 19 to allow storage of essential data whenever the vehicle battery is disconnected or whenever the Diagnosis PlugIn device 1 is disconnected momentarily. The Diagnosis PlugIn device 1 is intended to generally stay connected to the OBD plug 8, unlike the garage scan tool, which is plugged on the OBD plug only momentarily.

Each vehicle 50 comprises one or more on-board ECUs 3 with diagnostics functionality. One ECU (Electronic Control Unit) 31 may be in charge of ICE control functions including gases emissions control, another ECU may be in charge of braking/ABS/ESP functions, another ECU may be in charge of passive safety functions including airbags, another ECU may be the instrument panel with odometer and gauges, another ECU may be in charge of various body functions etc. . . .

For Hybrid/electric vehicles, the engine ECU is substituted by an enlarged concept, namely a "powertrain" ECU.

Each vehicle 50 has a unique VIN number 70. This number consists of 17 symbols, namely 17 characters, letter or numeral, as illustrated on FIG. 3.

Figure 3:
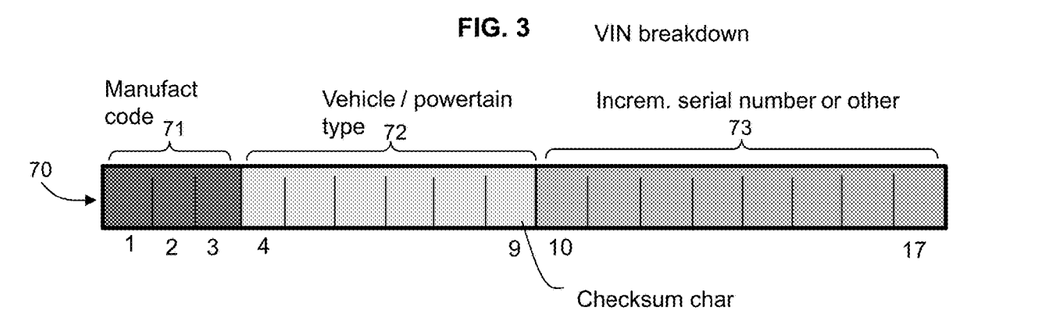
FIG. 3 illustrates a decomposition of the VIN number.

Normally the VIN number complies with ISO 3779 standard. However, there may be deviations or even errors in the VIN. Retrieval of VIN requires asking on the bus, namely placing a write request on the bus. VIN is not available on the free running broadcasted frames.

First section 71 (3 char.) denotes the vehicle manufacturer. For example "VF1" denotes RENAULT, "VF3" denotes PEUGEOT.

Second section 72 (6 char.) denotes the body type and the powertrain type.

Third section 73 (8 char.) is less rigid and may denote a serial incremental number, which may bear the Year information.

The second section may also include a checksum character, which is usually the $9^{th}$ character (see FIG. 3).

In the system 10, there are also provided one or more diagnostics database suppliers 4, connected to the Internet 5.

Diagnostics database suppliers 4 can be private specialized companies, diagnostics database suppliers 4 can also be one service provided by the vehicle manufacturer itself like Ford, VW, Toyota, Nissan, GM, Renault, FIAT, BMW, Volvo, etc. . . .

Diagnostics database suppliers 4 knows, for each technical platform from several manufacturers, the set of available diag services, which are otherwise designated by "Diagnosis stacks dataset". The host server 2 may have recourse to several diagnostics database suppliers whenever the data is not available on one of them, the host server 2 turns to another one.

Diagnosis stacks dataset define access methods, useful bus(s) and available diag services, with their respective codes, controls, expected answers with decoding scheme. ISO 15031 defines the minimum services and questions/answers that have to be supported.

Said otherwise, Diagnosis stacks dataset comprises all available request/answer services for this particular "vehicle type" (see definition below), and the hardware access method.

Although, as already mentioned, in order to avoid relying on the VIN number, it has been found by the inventors that we can rely on a "diag frame profile" otherwise called "frame profile" that will be explained later.

Generally speaking, various information collected thanks to the plug-in devices 1 are transmitted to one or more client fleet management server 6.

Preferably all the following items are connected together through the internet network 5: host server 2, diagnostics database suppliers 4, client fleet management server 6, a VIN decoder service 29.

More precisely, various information collected thanks to the plug-in devices 1 are transmitted wirelessly to the host server 2, in raw or decoded fashion. For some cases, decoding has to be done in the server(s) of the diagnostics database suppliers 4.

The decoded information is then transmitted to the client fleet management server 6. The fleet manager can therefrom perform various tasks of management of operation/maintenance/deliveries & missions; whenever the fleet manager is an insurance company, the proposed method also enables accurate collection of actual use for insurance financial charges.

According to one option, geolocation information is not transmitted to diagnostics database suppliers.

Figure 8:
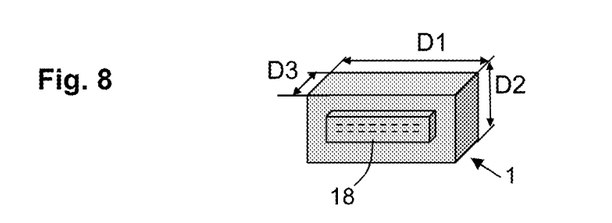
FIG. 8 illustrates the mechanical configuration of the Diag PlugIn device.
Figure 9:
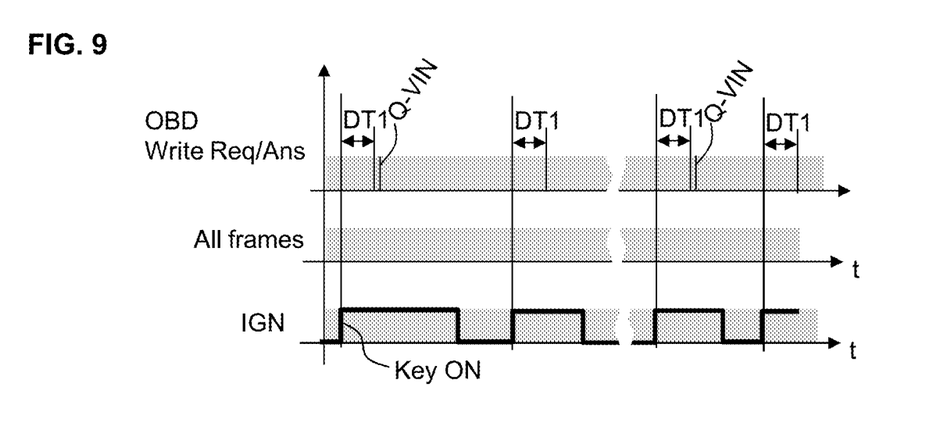
FIG. 9 illustrates several Key-On cycles.

As apparent from FIG. 8, the plug-in device 1 is very small, typically less than 50 mm thick (D3) with regard to the length D1 and width D2 of the OBD plug. It is intended to be installed in a very small volume next to the OBD plug.

Small dimensions of the OBD plug-in device 1 can be D1<50 mm, D2<25 mm, D3<50 mm.

Diagnosis plug-in device 1 has preferably no display, no user interface, preferably no switch. Diagnosis plug-in device 1 may bear an identification label for quality and traceability purposes. Diagnosis plug-in device 1 may have a Bluetooth or NFC interface. Diagnosis plug-in device 1 may have a micro USB port.

Buses States and Detection of Bus Active

After installation of the plug-in device 1, i.e. coupling to the onboard buses, the plug-in device listens all possible sources/pins and receives frames broadcasted by onboard ECUs on at least one Diagnosis bus.

If the vehicle is not used (engine stopped, doors locked, . . . ), the communication bus(es) are inactive. When the vehicle is on use, (engine usually running, motion, etc.) communication bus(es) are active. There are transitions, one from inactive to active when starting a cycle of use of the vehicle, one from active to inactive when ending the cycle of use of the vehicle; there may be intermediate states in the transitions eras; there may be different type of active states according to some operating conditions.

Figure 4:
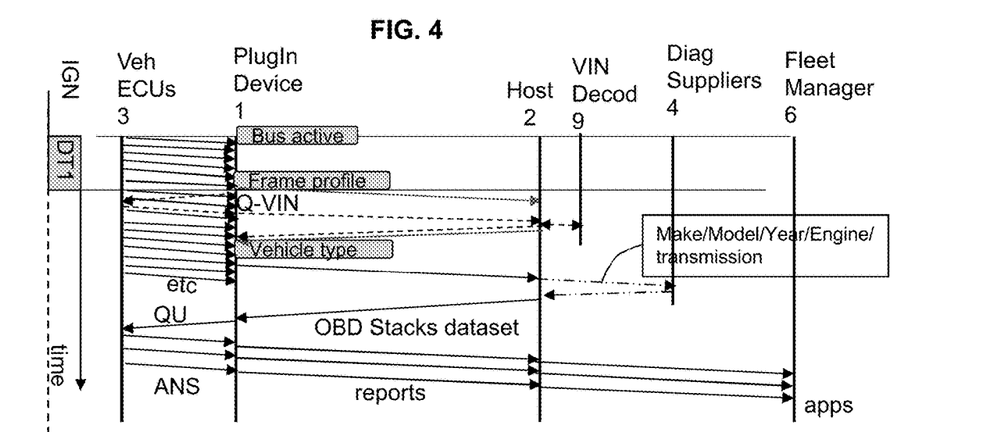
FIG. 4 shows a chart illustrating various messages exchanged to try and retrieve the VIN number.
Figure 5:
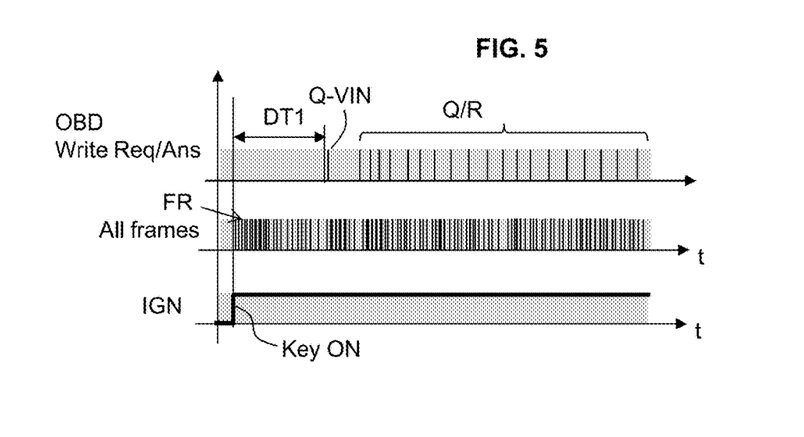
FIG. 5 shows a timing chart exhibiting the messages circulating on the BUS after "key on"

In the example illustrated on FIGS. 4 and 5, just after "key on", otherwise said "Ignition ON" on the ignition switch, various on-board ECUs 3 start sending messages FR on the Diag bus (CAN bus or other) also accessible on the Diag port 8, on broadcast mode.

More generally speaking, the "Ignition ON" can be broadened to a "Bus Active" condition. On some vehicles, activation of one or more bus(es) may coincide with door unlocking, driver door opening, or other condition. Therefore, the "Bus Active" condition is more relevant than simply Key On.

Engine crank and engine effective start can cause electric disturbances for which the bus may undergo some disturbances, due to possible reset of some ECUSs.

Generally speaking a Bus Active condition can be determined when, on at least one bus, a mean number of frames per time unit increases more than a predefined threshold.

For instance, this predefined threshold can be set to 20 messages/sec/sec or 50 messages/sec/sec.

Determination of "Frame Profile"

Each broadcasted message is characterized by a header named "Frame-ID"; each message is repeated periodically at a predefined frequency; each message is characterized by a length (up to 8 bytes for CAN standard), which is characterized by a number called DLC (Data Length Code).

Each vehicle manufacturer has its own messages definition. Practically, even each technical platform have its own messages definition (several commercials variants may be derived from one technical platform).

The inventors have found that an entity named "frame profile" characterizes each technical platform. Listen to all frames circulating on the bus helps to define such "frame profile" entity.

Note: "frame profile" can also be called "diag frame signature" or "diag fingerprint".

An example of basic frame profile can be a collection of pairs (frame ID, frequency, DLC).

One example is given here: (7B hexa, 20 ms, 6), (A3 hexa, 100 ms, 8), (92 hexa, 100 ms, 8), (11Ahexa, 60 ms, 5).

Payloads and other information can also be taken into account in a refined upgraded frame profile entity, otherwise called complementary frame profile.

Particularly payload for each frame, ordered sequence of frames, time interval between some particulars frames, are used to define an upgraded frame profile.

Additionally, "invariant" portions in payloads may be identified and stored in an upgraded frame profile; also toggling between two discrete values can be added to such upgraded frame profile.

There may be provided a hybrid definition of frame profile which includes a first sub profile with IGN On (but engine Off), and a second sub profile with Engine On.

Advantageously, in the proposed method, sporadic frames are discarded and disregarded in the overall analysis.

Ultimate refinement of frames analysis allows to define a unitary identification of the vehicle from the free running frames. Such unitary identification (with VIN or without VIN) can be used for stolen vehicle tracking purposes.

On Can bus, Frame ID is encoded on 11 bits in the basic address scheme, and on 29 bits on the extended address scheme. In the case of J1708, there are also Frame ID and header of the frames. Similar header characteristics are defined for other types of bus.

As long as the diag plug-in device 1 remains silent on the bus (listen only mode), this phase is called "passive time"; the duration of this passive phase is DT1.

According to one option, the predefined period of time DT1 is comprised between 1 s and 20 s, preferably between 3 s and 10 s, ideally 6 s.

According to one option, the period of time DT1 is adjusted according to collected Frame IDs on the bus.

Lookup Tables

There is defined a "vehicle type" VT being defined at least by the following information: Make, Model, Year, Powertrain of the vehicle of interest. Practically, this information substantially corresponds to a manufacturer technical platform and substantially corresponds to the 9 first characters of the VIN number.

"Make" is the manufacturer like FORD. "Mode"l is the vehicle model like FOCUS. "Year" is the manufacturing date of this vehicle like 2015. "Powertrain" is a code for the engine type and the transmission type (either manual, automatic, hybrid) like DV4 MP6 for instance. Regarding "engine" field, it encompasses engine type, ICE displacement, fuel type, etc. . . .

At the host server 2, there is provided a frame profile lookup table 22 wherein a plurality of pairs [frame profile, vehicle type] are stored. The lookup table 22 contains many records of frame profiles concerning a great number of vehicle manufacturer technical platforms. Each time one plug-In device 1 encounters a new frame profile and get the corresponding vehicle type (and optionally the diagnosis stacks dataset), the corresponding frame profile is appended to the table 22, which makes this lookup table 22 incremental.

Example of frame profile lookup table 22:

| | |
|---|---|
| (ID1, Freq1), (ID2, Freq2), (ID3, Freq3), etc | Vehicle type A |
| (ID1, Freq1), (ID6, Freq6), (ID8, Freq8), etc | Vehicle type B |
| (ID1, Freq1), (ID4, Freq4), (ID3, Freq3), etc | Vehicle type C |
| (ID2, Freq2), (ID5, Freq5), (ID7, Freq7), etc | Vehicle type D |
| (ID2, Freq2), (ID5, Freq5), (ID9, Freq9), etc | Vehicle type D |
| Etc . . . | Etc . . . |

There may be provided more than one frame profile for one Vehicle type in case of ECU update of platform facelift.

The frame profile lookup table 22 is centrally located at the host server 2 and is enriched by the communication received by a plurality of OBD plug-in devices 1, namely hundreds or thousands of devices 1, and benefit from uploads of plenty of frame profiles.

A copy of this frame profile lookup table 22 is downloaded at least to a newly connected plug-in device 1, and from time to time (long term updates). Therefore, the plug-in device 1 of interest has available in its remnant memory at least a partial copy 22a of the central frame profile lookup table 22.

Further, there is provided another lookup table, which is called here a diagnosis stacks dataset database 23 at the host server, which comprises, for each recorded vehicle type VT, a diagnosis stacks dataset or a link thereto. AS already mentioned, said diagnosis stacks dataset comprises at least available request/answer services for the vehicle type of interest.

Example of diagnosis stacks dataset database 23:

| | |
|---|---|
| Vehicle type A | diagnosis stacks dataset A |
| Vehicle type B | diagnosis stacks dataset B |
| Vehicle type C | diagnosis stacks dataset C |
| Etc . . . | Etc . . . |

At the plug-in device 1, one is at least one diagnosis stacks dataset has been used, it is stored locally 23a. Therefore, there is no need to request again this piece of information, each time the new vehicle cycle is starting, and a frame profile is determined, which is the same as before except for very special cases which are explained at the end of the present specification.

Determination of Vehicle Type via Frame Profile

Figure 7:
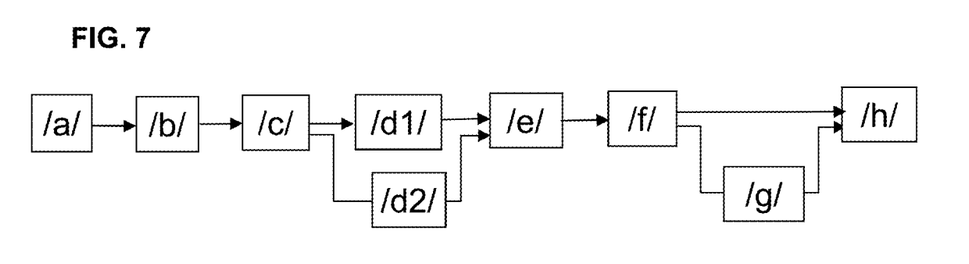
FIG. 7 illustrates the steps of the method.
Figure 10:
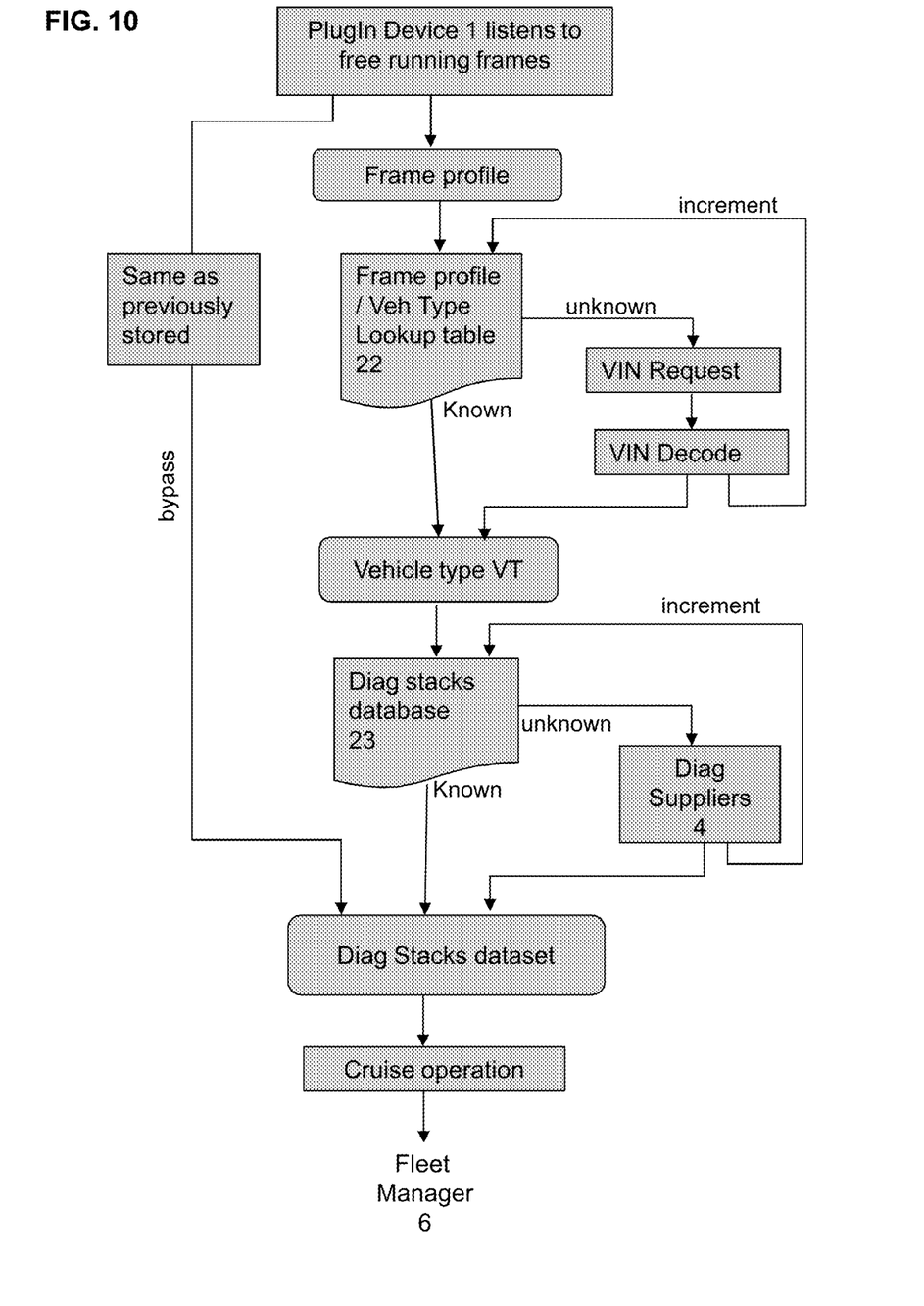
FIG. 10 shows a statechart illustrating the method.

As illustrated on FIGS. 7 and 10, once the frame profile has been determined (either basic or upgraded frame profile) at step /c/, lookup table 22 is browsed to search for this frame profile. If there is a match, then the vehicle type is known (step /d1/). Otherwise, if said frame profile is not known in the frame profile lookup table 22, then the VIN request process is used (see step /d2/ below), and the corresponding vehicle type is determined therefrom.

After that, the diagnosis stacks dataset database 23 is browsed to search for this vehicle type. If there is a match, then the diagnosis stacks dataset is known and used. Otherwise, if said diagnosis stacks dataset is not known, then the recourse to a diagnostics database suppliers 4 is performed (step /g/).

Said otherwise, (step /f/) if the diagnosis stacks dataset corresponding to this vehicle type is already available in the diagnosis stacks dataset database 23, the method proceeds to step /h/ as stated below, otherwise the method proceeds to step /g/ and then step /h/, Step /g/ is performed whenever the diagnosis stacks dataset corresponding to this vehicle type is not already available in the diagnosis stacks dataset database 23, At step /g/, vehicle type is sent to one of the diagnostics database suppliers 4, which sends in return the corresponding diagnosis stacks dataset.

At step /h/ the plug-in device 1 carries out the request/answer services defined by the diagnosis stacks dataset to write requests on the diagnosis bus and retrieves, in the corresponding answers, various data from the board ECUs 3, and report such data in a decoded form to a client fleet management system 6

VIN Retrieval: Special Cases

After "Bus active" condition is verified, and after some time in listen only mode, the OBD plug-in device 1 determines the instant frame profile. But it may happen that no vehicle type corresponds to the instant frame profile in the frame profile lookup table 22. In this case, a "VIN request" sequence is performed (Step /d2/) to retrieve alternately the required vehicle type.

To do so, the plug-in device 1 writes a request on the bus to retrieve the VIN number. This service is called "Q-VIN" in the present specification. The VIN number is returned by one of the on-board ECUs 3. The diag plug-in device 1 then forwards the retrieved VIN number to the Host server 2.

At this point, the host server 2 checks the checksum of the retrieved the VIN number.

At step /d2c/ VIN is decoded to determine vehicle type, (more precisely by decoding the first nine character of the VIN).

If the VIN format is OK, particularly the first section 71 and the second section 72, the host server determines vehicle type. The host server 2 or the plug-in device 1 may determine vehicle type internally according to a look-up table if this entry available is available therein. In the other case, the host server 2 may use the service of a VIN decoder server 9.

Repetitive Requests ("Cruise" Operation)

When the diagnosis stacks dataset is available to the diagnosis plug-in device 1, the latter issue repeated requests (QU) to retrieve interesting data the like mileage, fuel level, instant speed, average speed, geo location, various vehicle status information, etc. . . .

The raw answers are denoted by "ANS" on FIG. 4; whenever the diagnosis stacks dataset is open and contains encoding/decoding information, the diagnosis plug-in device 1 decodes the raw data and send "reports" 28 to the Host server 2 which in turn forwards it to the Fleet manager 6 with exploitable data in clear, like mileage, fuel level, instant speed, average speed, geo location, various vehicle status information.

Fleet manager 6 gathers information from the great number of vehicles, the fleet manager 6 handles various applications relating to the vehicle operation.

According to a particular case, the plug-in device 1 sends raw data to the Host server 2 which in turn forwards this raw data to the diagnostics database suppliers 4, which decodes raw data and sends back decoded data to the Host server 2 which in turn forwards this decoded data to the fleet manager server 6.

FIG. 7 illustrates a summary of the steps involved in the method.

/a/ couple the diagnosis plug-in device to the diagnosis port 8 of the vehicle of interest, the latter having a certain vehicle type, /b/ cause the diagnosis plug-in device to listen on at least one diagnosis bus accessible on the diag port, receive frames broadcasted by onboard ECUs and detect therefrom a Bus Active condition, /c/ after said Bus Active condition is verified, at the diagnosis plug-in device, determine a frame profile according to characteristics of the received frame-IDs, /d1/ determine vehicle type from the frame profile, with the help of the frame profile lookup table (22,22a)

or /d2/, whenever no vehicle type corresponds to the instant frame profile in the frame profile lookup table, then perform a VIN request sequence to alternately retrieve vehicle type, /e/ provide a diagnosis stacks dataset database (23), comprising, for each recorded vehicle type, a diagnosis stacks dataset or a link thereto.

/f/ if the diagnosis stacks dataset corresponding to this vehicle type is already available in the diagnosis stacks dataset database, proceed to step /h/, otherwise proceed to step /g/ and then step /h/, /g/ send the vehicle type to one of the diagnostics database suppliers 4, and receive in return a diagnosis stacks dataset, /h/ carry out the request/answer services defined by the diagnosis stacks dataset to write requests on the diagnosis bus and retrieve, in the corresponding answers, various data from the board ECUs ("cruise operation").

Erroneous VIN

In this case, there is provided a further step of inputting the VIN into a VIN Correction module and retrieving a corrected VIN. Checksum (9$^{th}$ char) is possibly used f to correct some mistakes or non-compliance occurring in certain VIN numbers.

Availability of Key on Signal, Bus Active Condition

Sometimes, an electrical signal reflecting "ignition on" or cranking is available at the OBD port.

However, in most cases, such electrical signal is not available, the OBD plug-in device 1 compensate by monitoring the number of messages circulating on the bus; for example, it can be decided that when a mean number of CAN frames per time unit increases more than a predefined threshold, then ignition has been set.

Power Supply Interruption

The power supply of the diagnosis plug-in device 1 may be interrupted if the diag plug-in device 1 is physically disconnected from the diag port 8 (for example in case of Scan Tool momentary connection), or if the battery of the vehicle happens to be disconnected.

Whenever the power supply of the diagnosis plug-in device 1 has been interrupted, the frame profile determination (and optionally the VIN request sequence) is carried out again at the next Bus Active condition. If the frame profile is not different from the previously stored frame profile (see "bypass" at FIG. 10) then the previously used diagnosis stacks dataset is taken again. Otherwise, the whole process of determining the vehicle type is carried out as mentioned above; and then the process of determining the diagnosis stacks dataset is carried out as mentioned above.

Besides, it may be decided that if the power supply of the diagnosis plug-in device has been maintained, the frame profile determination is not done repeatedly at each Bus Active condition.

Change of Vehicle

The case where the plug-in device is removed from one vehicle and placed on another vehicle has to be taken into account. This case is like the power supply interruption described above.

The invention claimed is:

1. A method carried out in a system, the system comprising at least a Diagnosis plug-in device, a host server, one or more diagnostics database suppliers, one or more on-board ECUs located on-board a vehicle of interest, the method comprising:

/a/ coupling the diagnosis plug-in device to a diagnosis port of the vehicle of interest, said vehicle of interest having a certain vehicle type, said vehicle type being defined at least by the Make and Model and Year and Powertrain of the vehicle of interest, /b/ causing the diagnosis plug-in device to listen on at least one diagnosis bus accessible on the diagnosis port, receive frames broadcasted by the one or more on-board ECUs and detect therefrom a Bus Active condition, the frames received each having a received frame-ID, /c/ after said Bus Active condition is verified, at the diagnosis plug-in device, determining an instant frame profile according to characteristics of the received frame-IDs of the frames received, /d1/ determining vehicle type from the instant frame profile, with the help of a frame profile lookup table held in the diagnosis plug-in device and/or in the host server, or /d2/, whenever no vehicle type corresponds to the instant frame profile in the frame profile lookup table, then performing a VIN request sequence to alternately retrieve vehicle type, /e/ providing a diagnosis stacks dataset database at the diagnosis plug-in device and/or at the host server, comprising, for each recorded vehicle type, a diagnosis stacks dataset or a link thereto, said diagnosis stacks dataset comprising at least available request/answer services for the vehicle type of interest, /f/ if the diagnosis stacks dataset corresponding to this vehicle type is already available in the diagnosis stacks dataset database, proceeding to step /h/, otherwise proceeding to step /g/ and then step /h/, /g/ sending the vehicle type to one of the diagnostics database suppliers, and receiving in return a diagnosis stacks dataset, /h/ carrying out the request/answer services defined by the diagnosis stacks dataset to write requests on the diagnosis bus and retrieving, in the corresponding answers, various data from the one or more on-board ECUs, and reporting such data in a decoded form to a client fleet management system.

2. The method of claim 1, wherein the VIN comprises 17 symbols including 9 first characters, wherein the VIN request sequence comprises:

/d2a/ asking on the bus for a vehicle VIN, namely Vehicle Identification Number, by a predefined request (Q-VIN), /d2b/ checking validity of a retrieved VIN, by analyzing the 17 symbols contained therein, and /d2c/ determining vehicle type from the retrieved VIN.

3. The method of claim 2, wherein at step /d2c/, determining vehicle type is done by decoding the 9 first characters of the retrieved VIN.

4. The method of claim 2, wherein at step /d2c/ the host server uses a remote VIN decoder service to help link the retrieved VIN with a vehicle type.

5. The method of claim 2, wherein at step /d2b/, if the VIN is determined to be erroneous upon analyzing the 17 symbols contained therein, namely for example a Checksum problem exists, there is provided a further step /e2/ of inputting the VIN into a VIN Correction database and retrieving a corrected VIN.

6. The method of claim 2, wherein a plurality of pairs [frame profile, vehicle type] are stored in the frame profile lookup table, and each time VIN request sequence is used for an unrecorded frame profile, a new record is added to the frame profile lookup table with the instant frame profile and the vehicle type determined at step /d2c/.

7. The method of claim 6, wherein a new record is added to diagnosis stacks dataset database with the vehicle type determined at step /d2c/ and the diagnosis stacks dataset used at step /h/.

8. The method of claim 1, wherein the determination of a frame profile is made by collecting, over a period of time DT1, the various frames circulating on the diagnosis bus, and retrieving for each frame: Frame-ID, repetition frequency and frame length, whereby a frame profile record comprises at least a list of [Frame-ID, repetition frequency, frame length].

9. The method of claim 8, wherein the determination of a frame profile record further comprises payload for each frame, an ordered sequence of frames, and a time interval between some particular frames.

10. The method of claim 8, wherein the period of time DT1 is predefined and is comprised between 1 s and 20 s.

11. The method of claim 1, wherein the Bus Active condition is determined when, on at least one bus, a mean number of frames per time unit increases more than a predefined threshold.

12. The method of claim 1, wherein the frame profile lookup table is stored at the host server and updated by a plurality of plug-in devices installed on a plurality of vehicles, and a copy of the frame profile lookup table is downloaded from time to time to the plug-in device of the vehicle of interest.

13. The method of claim 1, wherein the diagnosis stacks dataset comprises: an access method, a bus type, a location in diagnosis port pinout, and a list of available services.

14. A system comprising at least a diagnosis plug-in device, a host server, one or more diagnostics database suppliers, one or more on-board ECUs located on-board a vehicle of interest, the diagnosis plug-in device configured to be coupled to a diagnosis port of the vehicle of interest, said vehicle of interest having a certain vehicle type, said vehicle type being defined at least by the Make and Model and Year and Powertrain, the system being configured to:

/a/ cause the diagnosis plug-in device to listen on at least one diagnosis bus accessible on the diagnosis port, receive frames broadcasted by the one or more on-board ECUs and detect therefrom a Bus Active condition, the frames received each having a received frame-ID, /b/ after said Bus Active condition is verified, at the diagnosis plug-in device, determine an instant frame profile according to characteristics of the received frame-IDs of the frames received, /c1/ determine vehicle type from the instant frame profile, with the help of a frame profile lookup table held in the diagnosis plug-in device and/or in the host server, or /c2/, whenever no vehicle type corresponds to the instant frame profile in the frame profile lookup table, then perform a VIN request sequence to alternately retrieve vehicle type, /d/ provide a diagnosis stacks dataset database at the diagnosis plug-in device and/or at the host server, comprising, for each recorded vehicle type, a diagnosis stacks dataset or a link thereto, said diagnosis stacks dataset comprising at least available request/answer services for the vehicle type of interest, /e/ the diagnosis stacks dataset corresponding to this vehicle type is already available in the diagnosis stacks dataset database, proceed to step /g/, otherwise proceed to step /f/ and then step /g/, /f/ send the vehicle type to one of the diagnostics database suppliers, and receive in return a diagnosis stacks dataset, /g/ carry out the request/answer services defined by the diagnosis stacks dataset to write requests on the diagnosis bus and retrieve, in the corresponding answers, various data from the one or more on-board ECUs, and report such data in a decoded form to a client fleet management system.

15. The system of claim 14, wherein the VIN comprises 17 symbols, wherein the VIN request sequence comprises:

/c2a/ asking on the bus for a vehicle VIN, namely Vehicle Identification Number, by a predefined request (Q-VIN), thereby obtaining a retrieved VIN, /c2b/ checking validity of a retrieved VIN, by analyzing the 17 symbols contained therein, and /c2c/ determining vehicle type from the retrieved VIN.

* * * * *